United States Patent [19]
Dexter et al.

[11] 3,878,163
[45] Apr. 15, 1975

[54] 3,5-DIALKYL-4-HYDROXYPHENYL ALKANOIC ACID ESTERS OF 2,4,6-TRIS(ALKANOLAMINO) DERIVATIVES OF TRIAZINE AS ANTIOXIDANTS

[76] Inventors: Martin Dexter, 416 Cedar Dr., Briarcliff Manor, N.Y. 10510; David Herbert Steinberg, 2608 Davidson Ave., Bronx, N.Y. 10468

[22] Filed: Oct. 26, 1972

[21] Appl. No.: 301,037

Related U.S. Application Data

[62] Division of Ser. No. 159,022, July 1, 1971, Pat. No. 3,709,884.

[52] U.S. Cl. ........ 260/45.8 NT; 252/401; 260/249.6
[51] Int. Cl. ..................... C07d 55/50; C08f 45/60
[58] Field of Search ..... 252/401; 260/249.6, 45.8 N

[56] References Cited
UNITED STATES PATENTS
3,519,625   7/1970   Beachem et al. ............... 260/249.6
3,519,626   7/1970   Beachem et al. ............... 260/249.6

*Primary Examiner*—Benjamin R. Padgett
*Assistant Examiner*—Irvin Gluck
*Attorney, Agent, or Firm*—Charles W. Vanecek; Vincent J. Cavalieri

[57] ABSTRACT

3,5-dialkyl-4-hydroxyphenylalkanoic acid esters of 2,4,6-tris-(alkanolamino) derivatives of s-triazine can be prepared by reacting a 3,5-dialkyl-4-hydroxyphenylalkanoic acid with a 2,4,6-tris-(alkanolamino)-s-triazine. An example of such a compound is 2,4,6-tris-[3'-(3'',5''-di-t-butyl-4''-hydroxyphenyl)propionoxyethylamino]-1,3,5-triazine. These compounds are useful as stabilizers of organic substrates subject to oxidative and thermal degradation.

10 Claims, No Drawings

3,5-DIALKYL-4-HYDROXYPHENYL ALKANOIC ACID ESTERS OF 2,4,6-TRIS(ALKANOLAMINO) DERIVATIVES OF TRIAZINE AS ANTIOXIDANTS

This is a Division of copending application Ser. No. 159,022, filed on July 1, 1971, now U.S. Pat. No. 3,709,884.

DETAILED DISCLOSURE

The compounds of this invention are 3,5-dialkyl-4-hydroxyphenylalkanoic acid esters of 2,4,6-tris-(alkanolamino) derivatives of triazine which can be represented by the generic formula

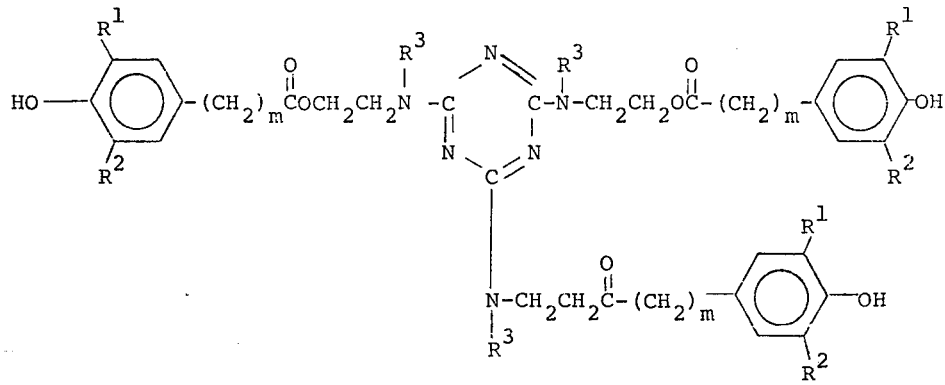

wherein each of $R^1$ and $R^2$ is a (lower)alkyl group of from 1 to 4 carbon atoms.

$R^3$ is an alkyl of from 1 to 8 carbon atoms or hydrogen, $m$ is 1 or 2.

Illustrative examples of (lower)alkyl groups which are represented by $R^1$ and $R^2$ are methyl, ethyl, propyl, isopropyl and t-butyl. The preferred groups are methyl and tertiary butyl.

The compounds of this invention can be prepared through esterification procedures known in the art. Thus, the triesters can be prepared by reacting a 3,5-dialkyl-4-hydroxyphenylalkanoic acid or acid halide thereof such as the acid chloride or acid bromide with the appropriate 2,4,6-tris-(alkanolamino) derivative of triazine having the formula:

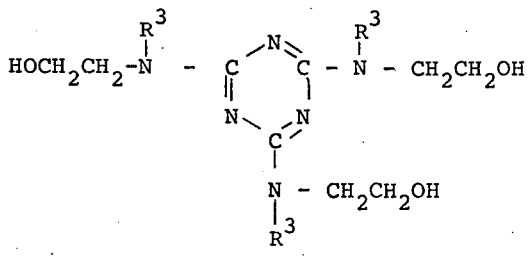

wherein $R^3$ has been defined previously.

When the free acid is employed, the esterification is preferably conducted in an inert non-aqueous organic solvent in the presence of an acid catalyst. An inert non-aqueous organic solvent is also preferably employed when the acid halide is utilized, together with an acid acceptor such as triethylamine or dimethylaniline.

Other esterification techniques, such as transesterification with an alkyl ester of the dialkyl hydroxyphenylalkanoic acid can also be employed. Thus, for example, a methyl ester of 3-(3',5'-dialkyl-4'-hydroxyphenyl)alkanoic acid and 2,4,6-tris-(2-hydroxyethylamino)-s-triazine are heated in the presence of a catalyst such as lithium hydride or dibutyltin oxide with removal of the methanol thus formed.

The 2,4,6-tris(alkanolamino) derivatives of triazine can be prepared by reacting cyanuric chloride with an alkanol amine in the presence of an alakali or alkali earth metal oxide or hydroxide in an organic medium substantially free from water as described in U.S. Pat. No. 3,573,301.

The triesters of this invention are stabilizers of organic material normally subject to thermal and oxidative deterioration. Materials which are thus stabilized include synthetic organic polymeric substances such as vinyl resins formed from the polymerization of vinyl halides or from the copolymerization of vinyl halides with unsaturated polymerizable compounds, e.g., vinylesters, $\alpha,\beta$-unsaturated ketones, $\alpha,\beta$-unsaturated aldehydes, and unsaturated hydrocarbons such as butadienes and styrene; poly-$\alpha$-olefins such as polyethylene, polypropylene, polybutylene, polyisoprene, and the like, including copolymers of poly-$\alpha$-olefins; polyurethanes and polyamides such as polyhexamethylene adipamide and polycaprolactam; polyesters such as polyethylene terephthalates; polycarbonates; polyacetals; polystyrene; polyethyleneoxide; and copolymers such as those of high impact polystyrene containing copolymers of butadiene and styrene and those formed by the copolymerization of acrylonitrile, butadiene and/or styrene.

Other materials which can be stabilized by the compounds of the present invention include lubricating oil of the aliphatic ester type, i.e., di(2-ethylhexyl)azelate, pentaerythritol tetracaproate, and the like; animal and vegetable derived oils, e.g., linseed oil, fat, tallow, lard, peanut oil, cod liver oil, castor oil, palm oil, corn oil, cottonseed oil, and the like; hydrocarbon materials such as gasoline, mineral oil, fuel oil, drying oil, cutting fluids, waxes, resins, and the like, salts of fatty acids such as soaps and the like.

In general, the stabilizers of this invention are employed from about 0.005% to about 10% by weight of the stabilized composition, although this will vary with the particular substrate. An advantageous range is from about 0.05 to about 5% and especially 0.05% to about 2%. These compounds are particularly useful for the stabilization of polyolefins such as polypropylene and polyethylene.

They can be blended before polymerization or after polymerization during the usual processing operations, for example, by hot-milling, the composition then being extruded, pressed, or the like into films, fibers, filaments, hollowspheres and the like. The heat stabilizing properties of these compounds advantageously stabilize the polymer against degradation during such processing at the high temperatures generally encountered. The stabilizers can also be dissolved in suitable solvents and sprayed on the surface of films, fabrics, filaments or the like to provide effective stabilization.

These compounds can also be used in combination with other additives such as antioxidants, sulfur-containing esters such as distearyl-$\beta$-thiodipropionate (DSTDP), dilauryl-$\beta$-thiodipropionate (DLTDP) in an amount of from 0.01 to 2% by weight of the organic material, and the like, pourpoint depressants, corrosion and rust inhibitors, dispersing agents, demulsifiers, antifoaming agents, carbon black, accelerators and other chemicals used in rubber compounding, plasticizers, color stabilizers, di- and tri-alkyl- and -alkylphenyl-phosphites, heat stabilizers, ultraviolet light stabilizers, dyes, pigments, metal chelating agents, dyesites and the like. Often combinations such as these, particularly the sulfur containing esters, the phosphites and/or the ultraviolet light stabilizers will produce superior results in certain applications to those expected by the properties of the individual components.

The following are presented to further illustrate the present invention without introducing any limitation thereto.

EXAMPLE 1

2,4,6-tris-[3'-(3'',5''-di-t-butyl-4''-hydroxyphenyl)-propionoxyethylamino]-1,3,5-triazine A mixture consisting of 38.6 g. of methyl 3,5-di-t-butyl 4-hydroxyphenylpropionate, 10.34 g of 2,4,6-tris-(2-hydroxyethylamino)-1,2,3-triazine and 100 mg of lithium hydride were heated under a nitrogen atmosphere for 5½ hours at 120°C at atmospheric pressure followed by 2½ hours at 130°C at 30 mm pressure. The methanol distilate was collected in a deen stark trap connected to a dry-ice cooled condensor. The crude product was dissolved in 75 ml of hot benzene and 0.8 ml of acetic acid and the mixture filtered. The solvent was evaporated under vacuum and the product was redissolved in 135 ml of benzene. The benzene solution containing the product was passed through an alumina column (670 g of Woelm, neutral, activity II) and eluted first with benzene, then with a 1:1 of benzene and chloroform and finally with chloroform. The product fractions were combined and the solvent evaporated under vacuum. The pure product was dried under vacuum at 80°–90° C to constant weight and had a melting point of 70°–80°C.

Analysis for $C_{60}H_{90}O_9N_6$:
 % Calculated: C, 69.33; H, 8.72; N, 8.08
 % Found: C, 69.23; H, 8.82; N, 7.74.

In a similar manner, by substituting an equivalent amount of 2,4,6-tris-(N-methyl-2-hydroxyethylamino)-1,3,5-triazine for 2,4,6-tris-(2-hydroxyethylamino)-1,2,3-triazine in the above procedure there is obtained 2,4,6-tris-[(3',5'-di-t-butyl-4'-hydroxyphenyl)acetoxy-N-methyl-ethylamino]-1,3,5-triazine.

EXAMPLE 2

Following the procedure of Example 1, the following methyl esters were substituted in equivalent amounts for methyl 3,5-di-t-butyl-4-hydroxyphenylpropionate (a) methyl 3-(3',5'-dimethyl-4'-hydroxyphenyl)propionate (b) methyl 3-(3-methyl-5-t-butyl-4-hydroxyphenyl)propionate (c) methyl 3',5'-di-t-butyl-4'-hydroxyphenyl acetate (d) methyl 3-methyl-5t-butyl-4-hydroxyphenyl acetate.

There are thus respectively obtained (a) 2,4,6-tris[3'-(3'',5''-dimethyl-4''-hydroxyphenyl)propionoxyethylamino]-1,3,5-triazine (b) 2,4,6-tris[3'-(3''-methyl-5''-t-butyl-4''-hydroxyphenyl)propionoxyethylamino]-1,3,5-triazine (c) 2,4,6-tris(3',5'-di-t-butyl-4'-hydroxyphenyl)acetoxyethylamino)-1,3,5-triazine (d) 2,4,6-tris(3'-methyl-5'-t-butyl-4'-hydroxyphenyl)acetoxyethylamino)-1,3,5-triazine.

EXAMPLE 3

Unstabilized polypropylene powder (Hercules Profax 6501) was thoroughly blended with 0.25% by weight of 2,4,6-tris[3'-(3'',5''-di-t-butyl-4''-hydroxyphenyl)propionoxyethylamino]-1,3,5-triazine and 0.5% by weight of a UV stabilizer 2-(3',5'-di-t-butyl-2'-hydroxyphenyl)-5'-chlorobenzotriazole (TINUVIN 327). Also prepared were samples of polypropylene containing 0.1% by weight of this same stabilizer of this invention and 0.3% by weight of DSTDP (distearyl-$\beta$-thiodipropionate). The blended materials were then milled on a two-roll mill at 182°C for 10 minutes, after which time the stabilizer polypropylene was sheeted from the mill and allowed to cool.

The milled polypropylene sheets were then cut into pieces and pressed for 7 minutes on a hydraulic press at 218°C, 2,000 pounds per square inch pressure. The resulting sheet of 25 mil thickness were tested for resistance to accelerated aging in a forced draft oven at 150°C. The results are set out in Table I below:

TABLE I

| Additive(s) | Oven Aging at 150°C Hours to Failure |
|---|---|
| 0.25% of 2,4,6-tris[3'-(3'',5''-di-t-butyl-4''-hydroxyphenyl)propionoxy-ethylamino]-1,3,5-triazine + 0.25% TINUVIN 327 | 160 |
| 0.1% of 2,4,6-tris[3'-(3'',5''-di-t-butyl-4''-hydroxyphenyl)propionoxyethylamino]-1,3,5-triazine + 0.3% DSTDP + 0.25% TINUVIN 327 | 340 |
| Unstabilized Polypropylene | 3 |
| 0.3% DSTDP alone | <20 |
| 0.5% TINUVIN 327 alone | 3 |

\* distearylthiodipropionate (a synergist for phenolic antioxidants)

The above data clearly indicates the significant increase in the stabilization of polypropylene upon addition of the antioxidant of the present invention.

Stabilized polypropylene compositions are also obtained when 0.5% of 2,4,6-tris(3',5'-di-t-butyl-4'-hydroxyphenyl)-acetoxyethylamino)-1,3,5-triazine or 0.5% of 2,4,6-tris(3-methyl-5-t-butyl-4-hydroxyphenyl)acetoxyethylamino-1,3,5-triazine are employed alone or in combination with DSTDP.

EXAMPLE 4

Pellets (500 g) of unstabilized nylon-6,6 (Zytel 101, DuPont) are placed in a Kitchen Aid Mixer. With mixing a solution of 2.5 g (0.5%) of 1,2-bis[3-(3,5-di-t-butyl-hydroxyphenyl)-propionamide]ethane in 20 ml of methylene chloride is added slowly. Sodium hypophosphite (0.5 gm. 0.1%) is dissolved in 20 ml of water and added slowly with mixing to the nylon pellets after the antioxidant solution has been added and most of the methylene chloride has evaporated. The stabilized pellets are dried at 80°C at <1mm for 4 hours.

The polyamide formulation is extruded at 600°F through a ¼ inch die into a rod which is water cooled and chopped into pellets. A ¾ inch Brabender extruder, equipped with a nylon screw, is used. The pellets are dried at 80° at <1mm for 4 hours.

The dried pellets are pressed into 5 × 5 × 0.005 inches films at 290° and 350 psi for 3 minutes. The mold is transferred quickly to a water-cooled press and maintained at 350 psi for 2 to 3 minutes.

Samples (2.2 g) of compression molded nylon-6,6 films are aged in an air circulating rotary oven at 150°C for various time periods. The viscosity of a 11% formic acid solution of aged and unaged polymer samples are determined at 25°C. Stabilizer effectiveness is judged by the percent retention of specific viscosity, color-formation, and weight retention after oven aging. The stabilized polyamide has better viscosity, color retention, and substantially less weight loss than a polyamide which is unstabilized after oven aging.

EXAMPLE 5

A water-white, refined (U.S.P. grade) mineral oil (Esso PRIMOL D) is stabilized and tested under the following test conditions.

A sample of the mineral oil (10 g) containing 0.1% by weight of 2,4,6-tris[3'-(3''-methyl-5''-t-butyl-4''-hydroxyphenyl)-propionoxyethylamino]-1,3,5-triazine is placed in a Sligh type oxidation flask filled with oxygen at room temperature (25°C) and atmospheric pressure. Thereafter, the flask is sealed to form a system having a mercury manometer which measures the pressure changes as oxygen is absorbed by the sample in the flask. The sample is then heated at 150°C until the manometer registers a decrease of 300 mm Hg pressure within the flasks with reference to the maximum pressure obtained at 150°C. Results of this test show the increase oxidation resistance for the sample containing the stabilizer.

EXAMPLE 6

High impact polystyrene resin containing elastomer (i.e., butadiene-styrene) is stabilized against loss of elongation properties by incorporation of 0.1% by weight of 2,4,6-tris[3'-(3'',5''-di-t-butyl-4''-hydroxyphenyl)propionoxyethylamino]-1,3,5-triazine. Under the test conditions described below, the stabilized resin retains a higher percentage of its original elongation properties, whereas the unstabilized resin retains less elongation properties. A substantial improvement in stability is also noted when only 0.05% of the stabilizer is employed.

The unstabilized resin is dissolved in chloroform and the stabilizer then added, after which the mixture is cast on a glass plate and the solvent evaporated to yield a uniform film which, upon drying, is removed and cut up, and then pressed for 7 minutes at a temperature of 163°C and a pressure of 2,000 pounds per square inch into a sheet of uniform thickness (25 mil). The sheets are then cut into strips, approximately 4 × 0.5 inches. A portion of these strips is then measured for length of elongation in the Instron Tensile tester (Instron Engineering Corporation, Quincy, Massachusetts).

The remaining portion of the strips is aged in a forced draft oven for 6 weeks at 75°C and thereafter tested for elongation. The stabilized polystyrene resin has retained much better its elongation property than the unstabilized resin.

EXAMPLE 7

A quantity of SBR emulsion containing 100 g of rubber (500 ml of 20% SBR obtained from Texas U.S., Synpol 1500) previously stored under nitrogen, is placed in a beaker and stirred vigorously. The pH of the emulsion is adjusted to 10.5 with a 0.5N NaOH solution.

To the emulsion is added 50 ml of 25% NaCl solution. A 6% NaCl solution adjusted with hydrochloric acid to a pH 1.5 is added in a thin stream with vigorous stirring. When pH 6.5 is reached, the rubber begins to coagulate and the addition is slowed down in order to maintain uniform agitation. The addition of the acidic 6% NaCl solution is terminated when a pH 3.5 is reached. The coagulated crumb-rubber slurry at pH 3.5 is stirred for one-half hour.

The coagulated rubber is isolated by filtration through cheese cloth, and rinsed with distilled water. After three subsequent washings with fresh distilled water, the coagulated rubber is dried, first at 25 mm Hg and finally to constant weight under high vacuum (<1 mm) at 40°–45°C.

The dried rubber (25 g) is heated under nitrogen at 125°C in a Brabender mixer and to this is added with mixing 1.25 g (0.5%) of 2,4,6-tris[3'-(3'',5''-di-t-butyl-4''-hydroxyphenyl)-propionoxyethylamino]-1,3,5-triazine. The composition is mixed for 5 minutes after which it is cooled and compression molded at 125°C into 5 × 5 × 0.025 inches plaques.

The plaques are placed on aluminum sheets and heated in a circulating air oven at 100°C for up to 96 hours. The viscosity of a 0.5% toluene solution of aged and unaged rubber samples are determined at 25°C. Stabilizer effectiveness is judged by the percent retention of specific viscosity, color formation and gel content after oven aging. The stabilized rubber has better viscosity, color retention, and less gel content than the rubber which is unstabilized after oven aging.

Similar results are obtained when 2,4,6-tris[3'-(3''-methyl-5''-t-butyl-4''-hydroxyphenyl)propionoxyethylamino]-1,3,5-triazine is used in place of the above mentioned stabilizer in the rubber composition.

EXAMPLE 8

To 50 g of polyacetal resin containing 0.1% of an acid scavenger dicyandiamide was added 0.25% by weight of 2,4,6-tris[3'(3'',5''-di-t-butyl-4''-hydroxyphenyl)propionoxyethylamino]-1,3,5-triazine. The resin containing this additive was milled for 7 minutes at 200°C in a Brabender Plasti-recorder. The milled formulation was subsequently pressed into a 40 mil sheet at 215°C at 350 psi for 90 seconds then cooled quickly in a cold press at 350 psi. The stabilized sheets were then remolded for 2 minutes at contact pressure and for 3 minutes at 300 psi at 215°C to give plaques 1½ × 2¼ × 125 mil. The resulting plaques were tested for resistance to accelerated aging in a force draft oven at 140°C and the time in hours to 4% weight loss was measured. Unstabilized samples of polyacetal containing only dicyandiamide were tested in the same manner and the results compared in Table II below.

TABLE II

| Additive(s) | Time in Hours to 4% Wt. loss at 140°C |
|---|---|
| 2,4,6-tris[3'-(3'',5''-di-t-butyl-4''-hydroxyphenyl)propionoxyethylamino]-1,3,5-triazine | 340 |
| No additive | <130 |

The data clearly shows the significant increase in the stabilization of the polyacetal upon addition of the antioxidant of the present invention.

EXAMPLE 9

A composition is prepared comprising linear polyethylene and 1.0% by weight of 2,4,6-tris[3'-(3''-methyl-5''-t-butyl-4''-hydroxyphenyl)propionoxyethylamino]-1,3,5-triazine. The composition is injected molded into tensile bars which are placed in a circulating air oven at 120°C. In contrast to those molded from unstabilized linear polyethylene, tensile bars molded from the instant composition retained its tensile strength for a substantially longer period.

EXAMPLE 10

Cyclohexene, freshly distilled is stabilized by the addition thereto of 0.05% by weight of 2,4,6-tris[3'(3''-methyl-5''-t-butyl-4''-hydroxyphenyl)propionoxyethylamino]-1,3,5-triazine. The effectiveness of this stabilizer in cyclohexene is tested by the ASTM D 525-55 oxidation test. The unstabilized cyclohexene fails in shorter time as compared to the stabilized cyclohexene.

EXAMPLE 11

A stabilized high temperature lubricating oil is prepared by incorporating 2% by weight of 2,4,6-tris[3''-(3'',5''-di-t-butyl-4''-hydroxyphenyl)propionoxyethylamino]-1,3,5-triazine to the lubricant which comprises diisoamyladipate. The stabilized composition is compared with the unstabilized lubricant by heating at 175° in the presence of air and metallic catalysts according to the test method described in Military Specification Mil-I-7808c. After 72 hours, the blank containing no stabilizer contains more sludge and has a greater viscosity than the stabilized lubricant.

What is claimed is:

1. A composition of matter stabilized against oxidative deterioration which comprises an organic material normally subject to oxidative deterioration containing from 0.005 to 5% by weight of a stabilizing compound of the formula

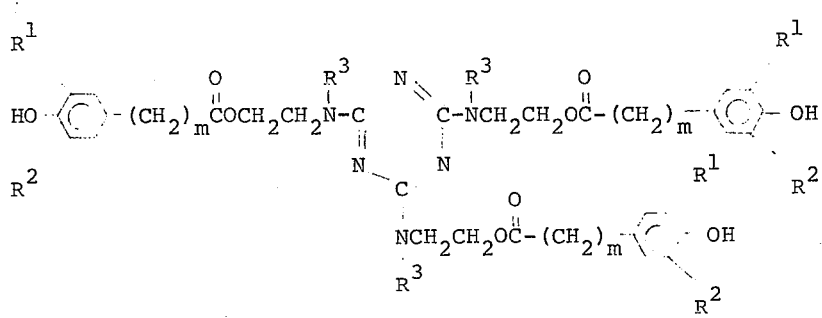

wherein each of $R^1$ and $R^2$ is a (lower)alkyl group of from 1 to 4 carbon atoms;

$R^3$ is an alkyl of from 1 to 8 carbon atoms or hydrogen, and $m$ is 1 or 2.

2. A composition of claim 1 wherein each of $R^1$ and $R^2$ is tert-butyl or methyl.

3. A composition of claim 2 wherein the stabilizer is 2,4,6-tris[3'-(3'',5''-di-tert-butyl-4''-hydroxyphenyl)propionoxyethylamino]-1,3,5-triazine.

4. A composition of claim 2 wherein the stabilizer is 2,4,6-tris[3'-(3''-methyl-5''-t-butyl-4''-hydroxyphenyl)propionoxyethylamino]-1,3,5-triazine.

5. A composition of claim 2 wherein the stabilizer is 2,4,6-tris-(3'-methyl-5'-t-butyl-4'-hydroxyphenyl)acetoxyethylamino)-1,3,5-triazine.

6. A composition of claim 2 containing a co-stabilizer selected from distearyl-β-thiodipropionate and dilauryl-β-thiodipropionate.

7. A composition of claim 2 wherein the organic material is a polyolefin.

8. A composition of claim 6 wherein the organic material is a polyolefin.

9. A composition of claim 8 wherein the organic material is polypropylene.

10. A composition of claim 9 which contains 2-(3',5'-di-t-butyl-2'-hydroxyphenyl)-5'-chlorobenzotriazole.

* * * * *

UNITED STATES PATENT AND TRADEMARK OFFICE
CERTIFICATE OF CORRECTION

PATENT NO. : 3,878,163
DATED : April 15, 1975
INVENTOR(S) : Martin Dexter, et al It is certified that error appears in the above—identified patent and that said Letters Patent are hereby corrected as shown below:

Kindly insert in the head, after the Inventors' names:

-- Assignee: CIBA-GEIGY Corporation, --
Ardsley, N.Y.

Signed and Sealed this

Seventh Day of February 1978

[SEAL]

Attest:

RUTH C. MASON
*Attesting Officer*

LUTRELLE F. PARKER
*Acting Commissioner of Patents and Trademarks*